US010862244B2

(12) United States Patent
Sze (10) Patent No.: US 10,862,244 B2
(45) Date of Patent: Dec. 8, 2020

(54) CORD-SECURING MECHANISM (71) Applicant: NIKE, Inc., Beaverton, OR (US)

(72) Inventor: Kevin C. Sze, Portland, OR (US)

(73) Assignee: NIKE, INC., Beaverton, OR (US)

(*) Notice: Subject to any disclaimer, the term of this patent is extended or adjusted under 35 U.S.C. 154(b) by 121 days.

(21) Appl. No.: 15/687,036

(22) Filed: Aug. 25, 2017

(65) Prior Publication Data
US 2018/0062318 A1 Mar. 1, 2018

Related U.S. Application Data (60) Provisional application No. 62/380,779, filed on Aug. 29, 2016.

(51) Int. Cl.
| F16B 39/00 | (2006.01) |
| H01R 13/639 | (2006.01) |
| A43C 7/00 | (2006.01) |
| F16G 11/10 | (2006.01) |
| A41F 1/00 | (2006.01) |
| A45C 13/10 | (2006.01) |
| F16G 11/04 | (2006.01) |
| F16B 1/02 | (2006.01) |
| F16B 2/08 | (2006.01) |
| B65D 30/00 | (2006.01) |

(52) U.S. Cl.
CPC ............ H01R 13/639 (2013.01); A41F 1/00 (2013.01); A43C 7/00 (2013.01); A45C 13/1046 (2013.01); F16B 1/02 (2013.01); F16B 2/08 (2013.01); F16G 11/044 (2013.01); F16G 11/103 (2013.01); B65D 29/00 (2013.01)

(58) Field of Classification Search
CPC .......... H01R 13/639; A41F 1/00; A43C 7/00; A45C 13/1046
See application file for complete search history.

(56) References Cited

U.S. PATENT DOCUMENTS

| 257,750 | A | * | 5/1882 | Parcelle | .................... | F16L 5/00 16/2.1 |
| 746,178 | A | | 12/1903 | Seaman | | |
| 1,163,112 | A | * | 12/1915 | Shaw | ....................... | A43C 5/00 24/713.7 |

(Continued)

FOREIGN PATENT DOCUMENTS

| CN | 86104965 A | 2/1987 |
| CN | 1331937 A | 1/2002 |

OTHER PUBLICATIONS

International Preliminary Report on Patentability dated Mar. 14, 2019 in International Patent Application No. PCT/US2017/048837, 7 pages.

(Continued)

Primary Examiner — Jason W San
(74) Attorney, Agent, or Firm — Shook, Hardy & Bacon L.L.P.

(57) ABSTRACT

A cord-securing mechanism includes a base portion, an aperture, and a cord-securing portion coupled to the base portion. The cord-securing portion includes at least a pair of cord-retaining surfaces that oppose one another and are spaced apart by a cord-receiving slot. When used in combination with a cord, the cord-securing mechanism may assist with setting a position of the cord and with impeding the cord from returning to a default position.

14 Claims, 6 Drawing Sheets

(56) References Cited

U.S. PATENT DOCUMENTS

| | | | | |
|---|---|---|---|---|
| 1,225,623 | A | 5/1917 | Hall et al. | |
| 1,425,591 | A * | 8/1922 | Jaques, Jr. | F16B 37/02 411/437 |
| 1,536,767 | A * | 5/1925 | Carter | F16B 39/286 411/213 |
| 1,674,986 | A * | 6/1928 | Norwood | B21K 1/705 470/19 |
| 2,845,673 | A | 8/1958 | Weis | |
| 3,199,564 | A * | 8/1965 | Waeltz | F16B 39/04 411/280 |
| 3,296,669 | A | 1/1967 | Elder, Jr. | |
| 3,358,338 | A | 12/1967 | Heinrich | |
| 3,443,616 | A * | 5/1969 | Dey | F16B 39/284 411/282 |
| 3,687,182 | A * | 8/1972 | Grimm | F16B 39/284 411/280 |
| 4,644,610 | A * | 2/1987 | Fish | A01G 13/04 211/70.6 |
| 4,697,312 | A * | 10/1987 | Freyer | B65D 33/1625 24/30.5 R |
| D308,011 | S | 5/1990 | Norris | |
| D313,929 | S | 1/1991 | Fildan | |
| 5,027,478 | A * | 7/1991 | Suhr | B65H 75/36 137/355.16 |
| 5,249,337 | A | 10/1993 | Cross et al. | |
| 5,542,461 | A | 8/1996 | Huang | |
| 5,647,107 | A * | 7/1997 | Brewster | G09F 7/00 24/713.6 |
| 5,699,591 | A | 12/1997 | Kane | |
| 5,791,022 | A | 8/1998 | Bohman | |
| 5,956,823 | A | 9/1999 | Borel | |
| 6,006,406 | A * | 12/1999 | Chung | A41H 37/02 24/114.12 |
| 6,094,783 | A | 8/2000 | Parsons | |
| 6,095,735 | A * | 8/2000 | Weinstein | F16B 39/10 411/197 |
| 6,233,782 | B1 * | 5/2001 | Regele | F16L 5/10 16/2.1 |
| 6,442,808 | B2 * | 9/2002 | Fildan | A41C 3/00 2/265 |
| D479,978 | S | 9/2003 | Watabe et al. | |
| 6,808,348 | B1 * | 10/2004 | Cosenza | F16B 39/286 411/280 |
| 7,607,618 | B2 | 10/2009 | Mori et al. | |
| 7,673,849 | B2 * | 3/2010 | Britton | F16B 31/04 254/29 A |
| D617,382 | S * | 6/2010 | Guirlinger | B43M 99/003 D19/83 |
| D625,985 | S | 10/2010 | Mori et al. | |
| 8,092,132 | B2 * | 1/2012 | Zink | F16B 39/103 411/198 |
| 8,407,868 | B2 * | 4/2013 | Chung | A44B 13/007 114/114 |
| D691,877 | S | 10/2013 | Ganski | |
| 8,628,284 | B2 * | 1/2014 | Martensson | F16B 39/04 411/197 |
| D730,986 | S * | 6/2015 | Moreau | D19/122 |
| 9,121,435 | B2 * | 9/2015 | Gignoux | F16B 39/10 |
| 9,157,504 | B2 | 10/2015 | Watanabe et al. | |
| 9,157,505 | B2 | 10/2015 | Seader | |
| 9,943,121 | B2 * | 4/2018 | Gellineau | A41D 1/002 |
| 2009/0056082 | A1 * | 3/2009 | Quimod | A44B 1/04 24/113 R |
| 2009/0282653 | A1 | 11/2009 | Yang | |
| 2010/0175732 | A1 * | 7/2010 | Ma | A45B 25/08 135/135 |
| 2010/0287791 | A1 | 11/2010 | Liu | |
| 2011/0010894 | A1 | 1/2011 | Honeycutt | |
| 2011/0132418 | A1 * | 6/2011 | Ma | A45B 25/08 135/37 |
| 2011/0302748 | A1 | 12/2011 | Avelar | |
| 2012/0060329 | A1 | 3/2012 | Zhang | |
| 2014/0259301 | A1 | 9/2014 | Berns et al. | |
| 2016/0025186 | A1 | 1/2016 | DeLuca | |
| 2016/0073745 | A1 * | 3/2016 | Moreau | F16M 13/04 24/11 R |
| 2016/0108989 | A1 * | 4/2016 | Symons | B42D 3/10 24/136 R |

OTHER PUBLICATIONS

International Search Report and Written Opinion dated Dec. 7, 2017 in International Patent Application No. PCT/US2017/048837, 12 pages.

"Vintage Cat Shoe Lace Holders Girls Pink Kitty Cat Shoe Lace Holders," etsy, etsy.com, accessed: Jan. 2016. https://www.etsy.com/se-en/listing/158763513/vintage-cat-shoe-lace-holders-girls-pink.

"BlueLounge® CableDrop™ Cord Clips," CableOrganizer.com, Inc., cableorganizer.com, Dec. 5, 2011. https://web.archive.org/web/20111205150248/http://cableorganizer.com/blue-lounge-designs/cabledrop/.

"1000pcs Pack 4mm Cord Slider Drawstring Plastic Rope Clamp Cord Lock Symmetrical Stopper #FLS097B," AliExpress™, aliexpress.com, accessed: Jan. 2016. http://www.aliexpress.com/item/1000pcs-4mm-Cord-Slider-Drawstring-Plastic-Rope-Clamp--Cord-Lock-Symmetrical-Stopper-FLS097B/1966014366.html?spm=2114.40010508.4.55.DKZUI9.

* cited by examiner

CORD-SECURING MECHANISM

CROSS-REFERENCE TO RELATED APPLICATIONS

This application, having U.S. application Ser. No. 15/687,036, filed Aug. 25, 2017, and entitled "Cord-Securing Mechanism," claims priority to U.S. Provisional Application No. 62/380,779, and entitled "Cord-Securing Mechanism," which was filed on Aug. 29, 2016. The entirety of the aforementioned application is incorporated by reference herein.

TECHNICAL FIELD

The present disclosure relates to a mechanism usable to set a position or length of a cord, such as a drawstring.

BACKGROUND

Cords or drawstrings are commonly used in many types of garments, such as sweatshirts, jackets, sweatpants, athletic shorts, and the like, for adjusting the size or fit of the garment. In addition, cords or drawstrings may be used to adjust the size of openings on other types of articles, such as a bag. Sometimes a cord lock may be utilized to "lock" the cord in place, thus allowing the cord or drawstring to be maintained in a selected position relative to the article.

BRIEF DESCRIPTION OF THE DRAWINGS

The present invention is described in detail herein with reference to the attached drawing figures, which are incorporated herein by reference, wherein.

DETAILED DESCRIPTION

Subject matter is described throughout this Specification in detail and with specificity in order to meet statutory requirements. But the aspects described throughout this Specification are intended to be illustrative rather than restrictive, and the description itself is not intended necessarily to limit the scope of the claims. Rather, the claimed subject matter might be practiced in other ways to include different elements or combinations of elements that are similar to the ones described in this Specification and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This principle is contemplated by and is within the scope of the claims.

This disclosure is generally directed to a cord-securing mechanism that is usable to maintain a position of a cord or a drawstring. For example, the cord-securing mechanism may be coupled with an article (e.g., garment or bag) that includes a drawstring in order to maintain a position of the drawstring and to retain free ends of the drawstring when the drawstring is cinched, released, or otherwise adjusted. The terms "cord" and "drawstring" may be used interchangeably throughout this disclosure and refer to an elongated flexible member that is coupled with an article to adjust a fit or size of the article. In addition, the cord-securing mechanisms described may be used with various other elongated flexible members, such as laces, cables, ropes, ties, wires, and the like.

In one aspect of the disclosure, the cord-securing mechanism includes a plurality of slots, channels, grooves, or other similar structures that frictionally engage the cord and that are arranged at varied positions on the cord-securing mechanism to provide alternative locking positions and configurations. In addition, the cord-securing mechanism may facilitate one-handed adjustment. These and other features will be described in more detail in other parts of this disclosure.

In accordance with an aspect of the disclosure, the cord-securing mechanism comprises a base portion comprising a first surface, a second surface, a thickness extending between the first surface and the second surface, and an aperture extending entirely through the thickness and from the first surface to the second surface. Further, the cord-securing mechanism includes an aperture surface that circumscribes and forms a perimeter around the aperture, an aperture rim is positioned at a transition between the aperture surface and the first surface, and an axis. Additionally, the cord-securing mechanism further comprises a cord-securing portion coupled to the first surface, the cord-securing portion including at least a pair of cord-retaining surfaces that oppose one another and that are spaced apart by a cord-receiving slot, wherein cord-retaining surfaces of the at least the pair of cord-retaining surfaces extend from the first surface in a direction aligned parallel with the axis and extend radially away from the aperture rim, and wherein the cord-retaining surfaces extend radially away from the aperture rim.

In another aspect, an assembly for securing a cord is provided comprising a cord-securing mechanism having a base portion comprising a first surface, a second surface, a thickness extending between the first surface and the second surface. An aperture extends entirely through the thickness and from the first surface to the second surface, the aperture including an aperture surface that circumscribes, and forms a perimeter around the aperture. The aperture also includes an aperture rim positioned at a transition between the aperture surface and the first surface and an axis. The assembly for securing a cord further comprises at least a pair of cord-securing portions coupled to the first surface, the at least the pair of cord-securing portions including at least a pair of cord-retaining surfaces that oppose one another and that are spaced apart by a cord-receiving slot. The cord-retaining surfaces of the at least the pair of cord-retaining portions may extend from the first surface in a direction aligned parallel with the axis and extend radially away from the aperture rim, the at least the pair of the cord-securing portions including an internally-oriented portion that is oriented towards, and offset from, the aperture rim. Additionally, the assembly for securing a cord may further comprise a grommet positionable within the aperture and including a flange that engages the first surface.

In another aspect, an article is provided comprising a textile layer having a first surface, a second surface, and an aperture extending therethrough. The article may further comprise a cord-securing mechanism having a base portion with a first surface, a second surface, a thickness extending between the first surface and the second surface. The cord-securing mechanism also includes an aperture extending entirely through the thickness and from the first surface to the second surface. The aperture includes an axis, an aperture surface, and an aperture rim positioned at a transition between the aperture surface and the first surface. The cord-securing mechanism may further comprise at least a pair of cord-securing portions coupled to the first surface, the at least the pair of cord-securing portions including at least a pair of cord-retaining surfaces that oppose one another and that are spaced apart by a cord-receiving slot. Cord-retaining surfaces of the at least the pair of cord-retaining portions extend from the first surface in a direction aligned parallel with the axis and extend radially away from the aperture rim, and the at least the pair of the cord-securing portions includes an internally-oriented portion that is oriented towards, and offset from, the aperture rim. Additionally, the article may further comprise a grommet positionable within the aperture and including a flange that engages the first surface.

Figure 1:
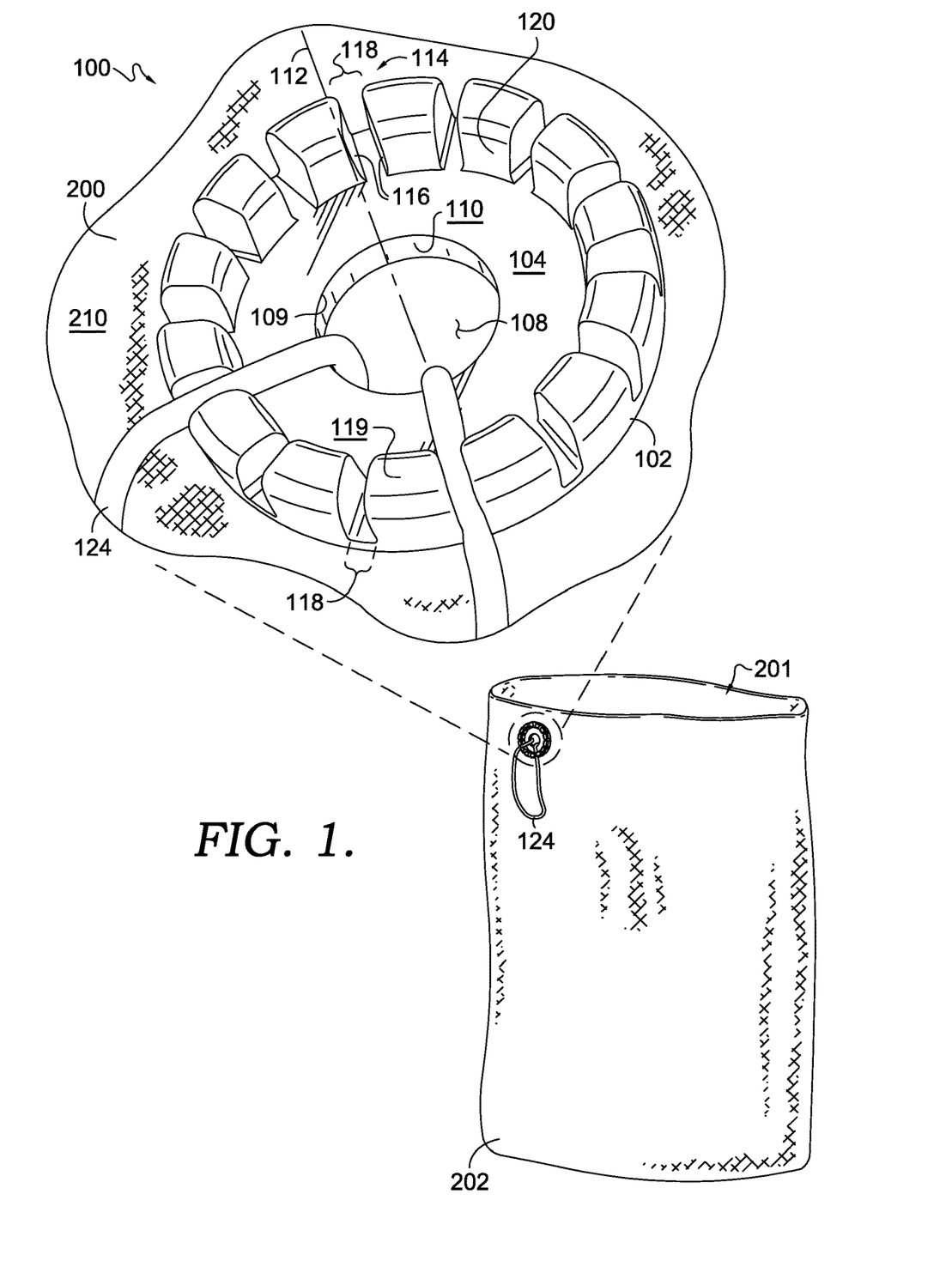
FIG. 1 depicts a perspective view of an exemplary article having a cord-securing mechanism, in accordance with an aspect of the disclosure.

Turning now to FIG. 1, an article 200 is depicted with a cord 124 and a cord-securing mechanism 100. The article 200 is depicted in FIG. 1 as a bag 202. However, the depiction of the article 200 as the bag 202 is merely exemplary, and other types of articles and garments are considered within the scope of this disclosure, such as sweatshirts, jackets, sweatpants, athletic shorts, and the like. In FIG. 1, the cord-securing mechanism 100 is affixed to the outer surface 210 of the bag 202. The bag 202 comprises an opening 201 which may increase or decrease in diameter based on the tightening or loosening of the cord 124. Without the cord-securing mechanism 100, the exposed portion of the cord 124 that is depicted in FIG. 1 might not retain an adjusted position after the cord has been tightened or loosened without some additional measure being taken, such as tying the cord 124. As such, the cord-securing mechanism 100 may assist with retaining the free or loose end(s) of the cord.

Figure 2:
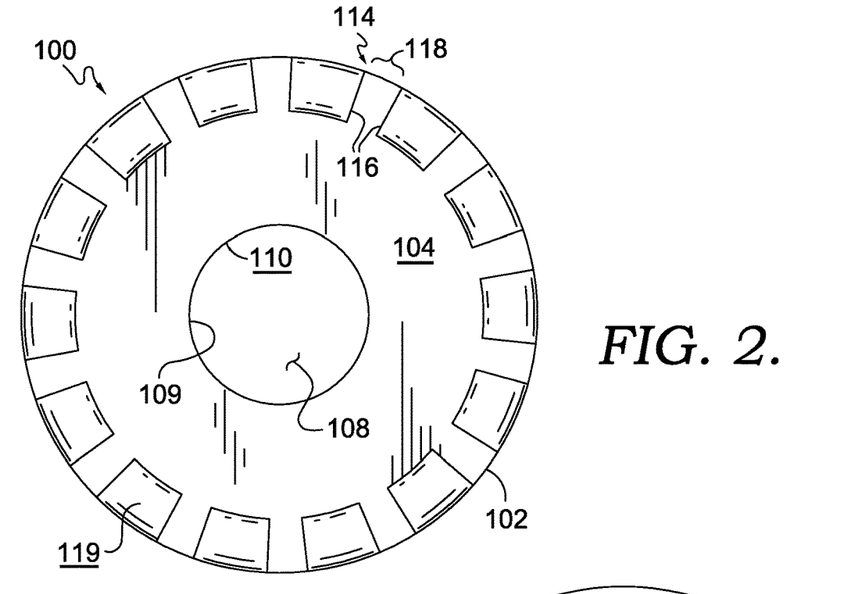
FIG. 2 depicts a front view of the exemplary cord-securing mechanism, in accordance with an aspect of the disclosure.
Figures 3, 4:
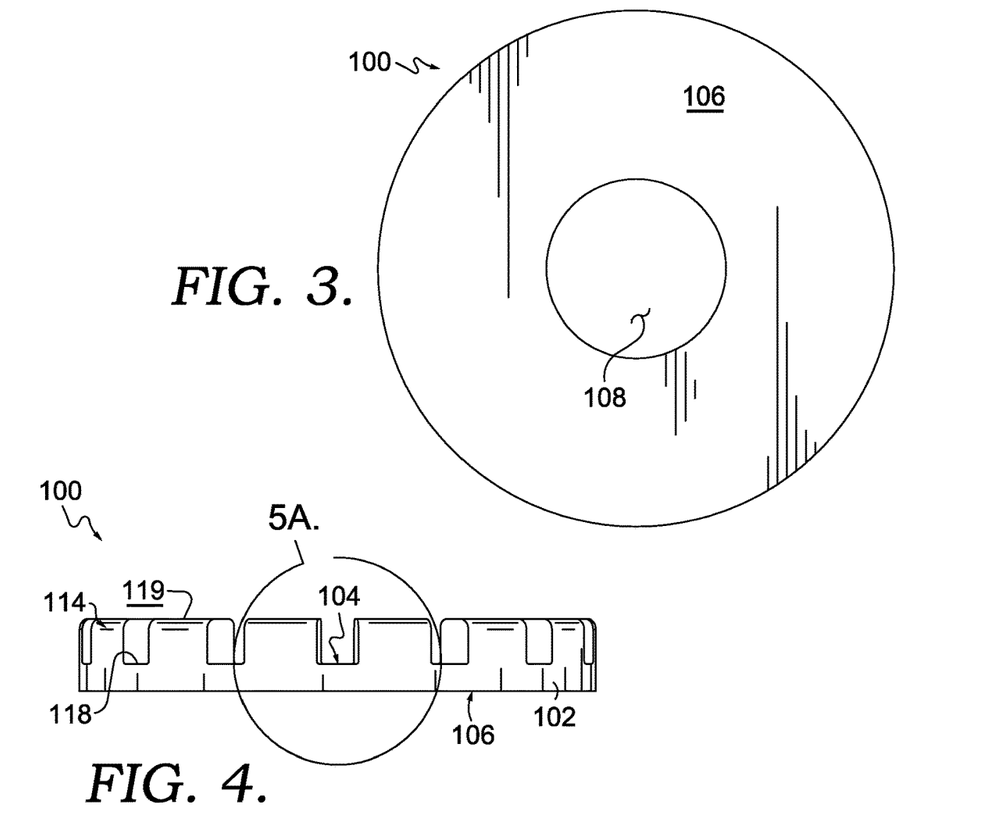
FIG. 3 depicts a back view of the exemplary cord-securing mechanism, in accordance with an aspect of the disclosure.
FIG. 4 depicts a side view of the exemplary cord-securing mechanism, in accordance with an aspect of the disclosure.

With continued reference to FIG. 1, as well as FIGS. 2 and 3, the cord-securing mechanism 100 comprises a base portion 102 which has a first surface 104 and an opposing second surface 106. The cord-securing mechanism 100 also includes an aperture 108 which extends entirely through the thickness from the first surface 104 to the second surface 106. The aperture 108 comprises an aperture surface 110 which circumscribes and forms a perimeter around the aperture 108. In other words, the aperture surface 110 corresponds to the surface formed from the aperture 108 extending through the thickness from the first surface 104 to the second surface 106. The cord-securing mechanism 100 also includes an aperture rim 109 positioned at a transition between the first surface 104 and the aperture surface 110. FIG. 1 also depicts an axis 112 as a hypothetical line representing the geometrical center of the cord-securing mechanism, and the axis 112 does not exist in reality, but instead is merely provided as a means of facilitating the reader's understanding of aspects herein.

The cord-securing mechanism 100 includes a cord-securing portion 114 coupled to the first surface 104. The cord-securing portion 114 comprises at least a pair of cord-retaining surfaces 116 that generally oppose one another, and are generally spaced apart by a cord-receiving slot 118. In other words, the walls of the cord-securing portion 114 which extends radially outward from the axis 112 are referred to as the cord-retaining surfaces 116, with the cord-receiving slot 118 positioned therebetween. Therefore, as shown in FIG. 2, the cord-retaining surfaces 116 are not necessarily parallel with one another, but instead slightly taper from the outer circumference of the cord-securing mechanism 100 towards the axis 112. However, in some aspects the cord-retaining surfaces may extend substantially parallel with one another. Additionally, it is contemplated that in other aspects, the cord-retaining surfaces 116 taper toward the outer circumference of the cord-securing mechanism 100. In other words, the cord-receiving slot 118 may taper toward the outer circumference of the cord-securing mechanism 100, toward the axis 112, or may have no tapering (with respect to outer circumference of the cord-securing mechanism).

In accordance with aspects herein, the cord receiving slot 118 may be any size which would permit the cord (124, not shown in FIG. 2) to fit into the cord receiving slot 118. However, the cord receiving slots 118 are generally sized to be slightly smaller than the diameter of cord 124, such that the cord 124 must be press fit into the cord receiving slots 118. Consequently, the friction force between the cord retaining surfaces 116 and the cord 124 is what causes the cord 124 to be "locked" into place. The cord-securing mechanism 100 may be operated in various manners. For example, in one aspect the cord 124 may be pulled in a direction that is substantially parallel to the axis 112 in order to reduce a size of the opening. In order to set an opening size by maintaining a position of the cord 124 relative to the bag 202, the cord 124 may be rotated, pulled, or swung in a direction towards the bag 202 and towards the cord-securing mechanism 100 until the cord 124 inserts into (and frictionally engages) one or more of the cord-securing portions 114. Absent the present invention, some cord locks require a two-handed operation, in which a user grips and operates the cord lock with one hand, and pulls on the cord with the other hand. However, an aspect of this disclosure allows for one-handed operation by using a single hand to pull outward on the cord 124 and by using the same hand to move the cord 124 towards the cord-securing mechanism 100 and into at least one of the cord-securing portions 114.

As depicted in FIGS. 1 and 2, the cord-securing mechanism 100 may include a plurality of cord-securing portions 114 radially oriented about the axis 112. In the illustrative figures, the base 102 is circular in shape, and in other aspects the base may include other shapes having straight edges, round edges, or a combination thereof. In aspects in which the cord-securing mechanism 100 is a non-circular shape (e.g., triangular, square, or other polygon), the cord-securing portions 114 may be repeated around the entire perimeter of the cord-securing mechanism 100. Although FIGS. 1 and 2 depict the cord-securing portions around the entire perimeter, in other aspects the cord-securing portions may be positions around at least a portion of the perimeter. In addition, in an alternative aspect, the cord-securing mechanism my include a single cord-securing mechanism. Any and all aspects of different shaped cord-securing mechanisms and repeated patterns of cord-securing portions are considered within the scope of this disclosure.

Positioning the plurality of cord-securing portions around at least a portion of the perimeter provides a plurality of positions at which a cord may be secured, such that a variety of different slots exist in which the cord may be retained. Providing a plurality of options for positions in which a cord may be secured may offer various benefits. For example, when the cord 124 is being locked into position by moving the cord 124 towards the cord-securing mechanism 100, the cord can be oriented at a variety of different angles without affecting or preventing the ability of the cord to lock into position. That is, absent this aspect of the present invention, a cord lock might include only a single, dedicated slot for each length of the cord, such that the cord must be oriented at a more precise angle in order to lock into position. As such, in an aspect of the current invention, the cord 124 can be locked into position by moving the cord to upward, downward, left, right, and any combination thereof. Further, the two lengths of the cord 124 can be oriented at different angles with respect to one another, such as 45 degrees, 90 degrees, 135 degrees, 180 degrees, and various angles in between. Turning now to FIG. 4, a side view of the exemplary cord-securing mechanism 100 is depicted. In FIG. 4, the cord-securing portion 114 comprises a distal surface 119, which is generally defined as being the outermost surface of the cord-securing mechanism 100 in a direction aligned with the axis 112 (not shown in FIG. 4).

Figure 5A:
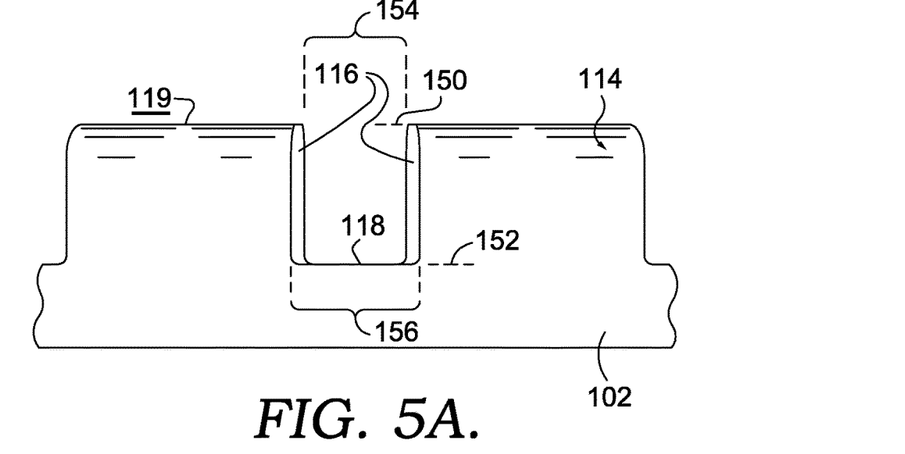
FIGS. 5A, 5B and 5C depict alternative configurations of a cord-receiving slot shown in FIG. 4, in accordance with some aspects of the disclosure.
Figure 5B:
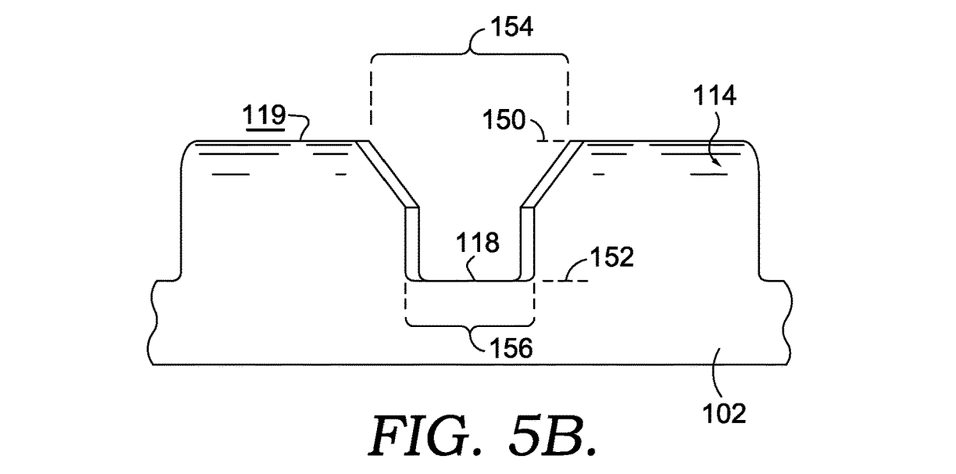
Figure 5C:
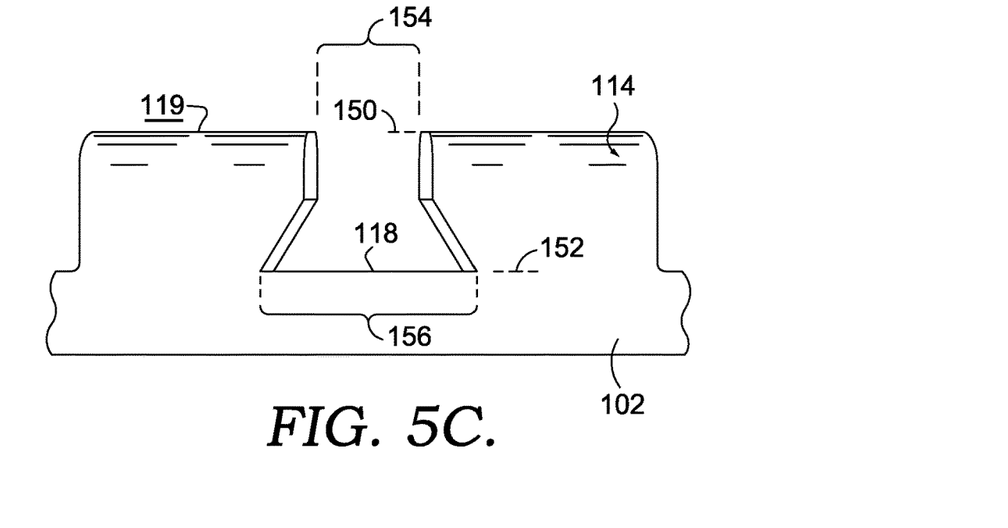

Turning now to FIGS. 5A, 5B and 5C, alternative configurations of the cord-receiving slot 118 are depicted in accordance with aspects herein. As seen in FIGS. 5A-5C, the geometry of the cord-receiving slot 118 may be defined based on the tapering (or lack thereof) of the cord-retaining surfaces 116 moving from the distal surface 119 towards the first surface 104. Therefore, in accordance with this disclosure, the tapering of the cord-retaining surfaces 116 may be defined based on the distances between a first position 150 and a second position 152. The terms "first position" and "second position" generally refer to geometrical positions with respect to the cord-securing portion 114. For example, in FIG. 5, the first position 150 generally occurs proximate the distal surfaces 119 of the cord-securing mechanism 100, while the second position 152 generally occurs proximate the first surface 104.

Therefore, in accordance with aspects herein, the tapering of the cord-receiving slot 118 may be defined based on the distances between adjacent cord-securing surfaces 116 at the first position 150 and the second position 152. For example, as shown in FIG. 5A, the cord-retaining surfaces 116 are spaced apart by a first distance 154 at the first position 150 and by a second distance 156 at the second position 152, such that the first distance 154 and the second distance 156 are substantially similar, resulting in a cord-receiving slot with no tapering. In another aspect as shown in FIG. 5B, the first distance 154 is greater than the second distance 156, such that the cord-receiving slot 118 tapers from the first position 150 to the second position 152. An advantage of the configuration shown in FIG. 5B is that the cord (not shown) may be easily fed into the cord-receiving slot 118, and then retained within the narrower cord-retaining portions 116 proximate the second position 152. In yet another aspect as shown in FIG. 5C, the cord-retaining portions 116 taper from the second position 152 to the first position 150, such that the cord-receiving slot is narrower proximate the distal surface 119.

Further, with continued reference to FIGS. 5A-5C, the cord-receiving slot 118 may comprise multiple sections which taper toward or away from the first surface 104. For example, the cord-receiving slot 118 may comprise three sections of tapering, with a first section positioned proximate to the distal surface 119 and tapering toward the first surface 104, a second section positioned closer to the first surface 104 having no tapering, and a third section positioned proximate to the first surface 104 and tapering toward the distal surface 119. Therefore, in this aspect, the cord-receiving slot 118 would have an appearance similar to an hourglass from the perspective shown in FIGS. 5A-5C.

Figure 6A:
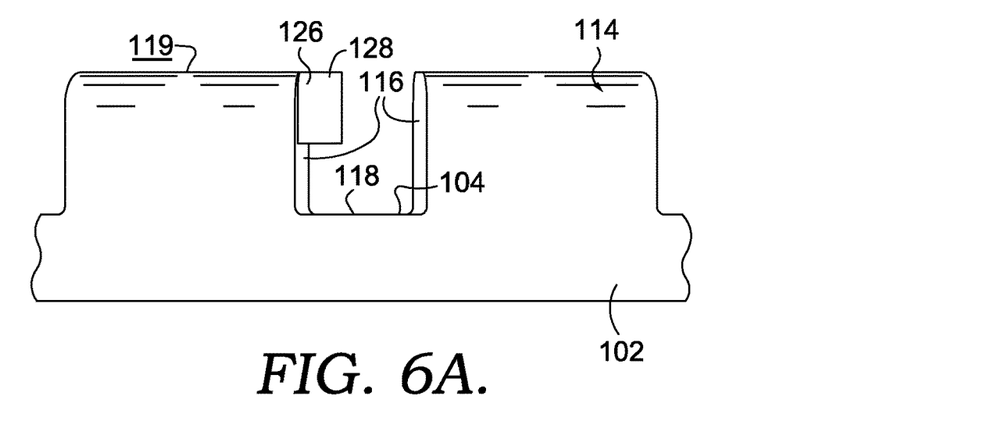
FIGS. 6A, 6B and 6C depict a rib or nub positioned within the cord-receiving slot, in accordance with some aspects of the disclosure.
Figure 6B:
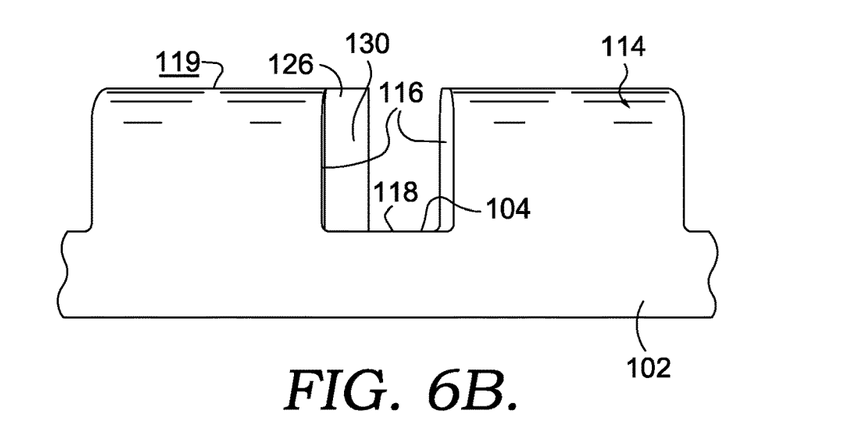
Figure 6C:
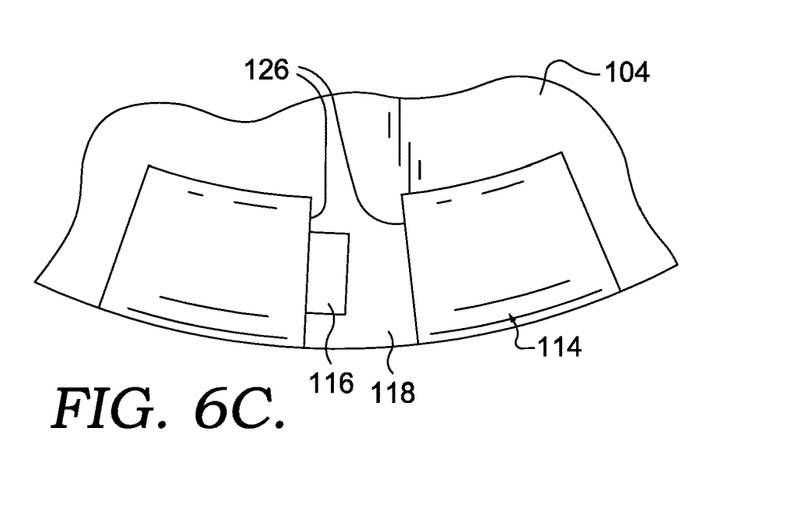

Turning now to FIGS. 6A-6C, a protruding member 128 positioned within the cord-receiving slot 118 is depicted, in accordance with aspects herein. In general, the advantage of providing the protruding member 128 within the cord-receiving slot is its reduction of the distance between adjacent cord-retaining surfaces 116, such that the cord-receiving slot 118 provides an additional amount of frictional force between adjacent cord-retaining surfaces 116 and the cord 124. In other words, reducing the distance between adjacent cord-retaining surfaces 116 reduces the likelihood that the cord 124 (not shown) accidentally becomes dislodged from the cord-receiving slot 118.

In aspects shown in FIG. 6A, the protruding member 126 is depicted as a nub 128. In accordance with this disclosure, the term "nub" refers to a protruding member 126 which does not extend completely from the distal surface 119 to the first surface 104. For example, in FIG. 6A, the nub 128 extends within the cord-receiving slot 118 from the distal surface 118 to approximately halfway between the distal surface 119 and the first surface 104. However, in some aspects, the distance between the bottom (nearest to 104) surface of the nub and bottom surface 104 of the slot may be greater or less than half of the height of the cord-receiving slot 118. In the aspects shown in FIG. 6B, the protruding member 126 is depicted as a rib 130. The rib 130 is coupled to the cord retaining surface 116, and spans the entire height of the cord-receiving slot 118. Turning now to FIG. 6C, a top view of the protruding member 126 from FIGS. 6A and 6B is depicted. As shown in FIG. 6C, the protruding member 126 has a generally rectangular cross section. However, this is merely exemplary, and protruding members having round, elliptical, square, or other shaped cross-sections are within the scope of this disclosure.

In accordance with this disclosure, the cord-securing mechanism 100 may be a standalone mechanism, or the cord-securing mechanism 100 may be affixed to an article, such as the bag shown in FIG. 1. As seen in FIGS. 7-11, the cord-securing mechanism 100 is depicted as having a grommet 204 positioned within the aperture 108 of the cord-securing mechanism. However, the grommet 204 is merely one example of a type of affixing mechanism which could be used to secure the cord-securing mechanism to an article. For example, it is contemplated that the cord-securing mechanism may be bonded to the article via sonic welding, thermal bonding, pressure bonding, and the like. Additionally, in another aspect, the cord-securing mechanism 100 may be adhered to the article through the use of double-sided tape, glue, or other adhering techniques. In yet another aspect, the cord-securing mechanism 100 may be sewn onto the article, molded onto the article, or 3D printed onto the article. Any and all aspects of affixing or otherwise coupling the cord-securing mechanism 100 to the article are considered to be within the scope of this disclosure.

Figures 7, 8:
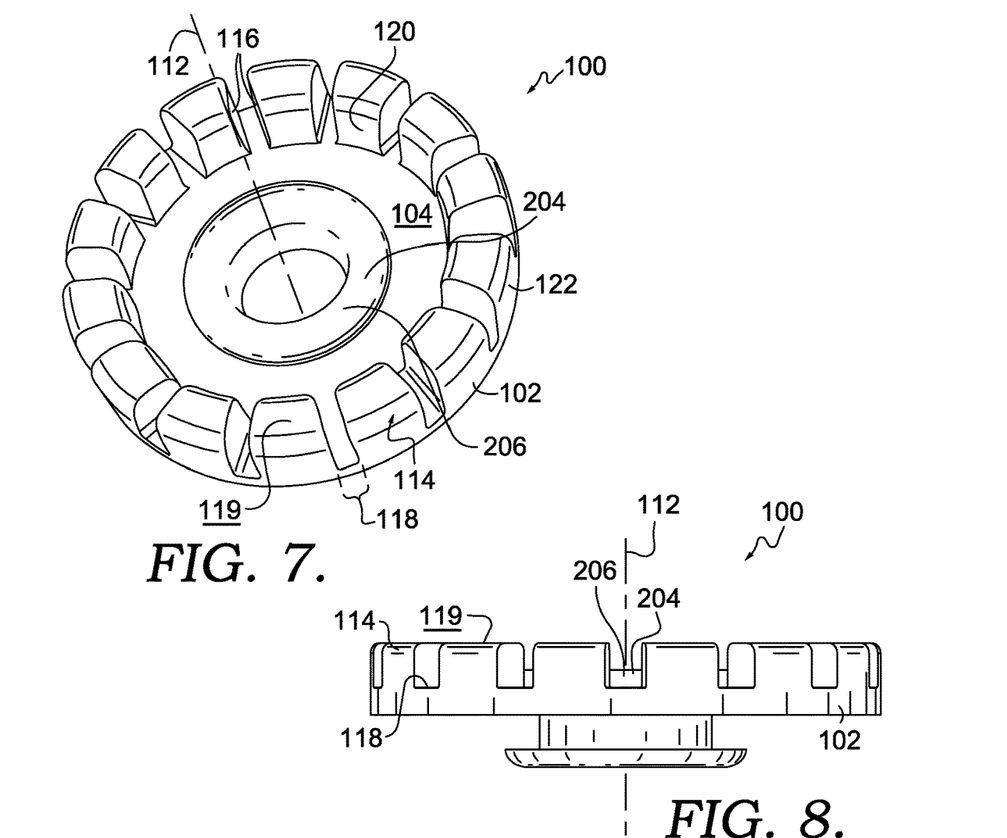
FIG. 7 depicts a perspective view of an assembly for securing a cord, in accordance with an aspect of the disclosure.
FIG. 8 depicts a side view of an assembly for securing a cord, in accordance with an aspect of the disclosure.

Turning now to FIGS. 7 and 8, the cord-securing mechanism 100 is depicted as having the grommet 204 positioned within the aperture 108. As discussed previously, the grommet 204 is generally used to affix the cord-securing mechanism 100 to an exemplary article. As best illustrated with reference to FIG. 8, the grommet 204 is positionable within the aperture 108 and includes a flange 206 that engages the first surface 104. As seen in FIG. 7, and as discussed previously, the cord-securing portion 114 includes a plurality of pairs of cord-retaining surfaces 116, wherein each pair of the plurality of pairs of cord-retaining surfaces 116 is spaced apart by a respective cord-receiving slot 118, and wherein the plurality of pairs of cord-retaining surfaces 116 are positioned radially around the aperture rim. Also in FIG. 7, the cord-securing portion 114 includes an internally-positioned terminal edge 120 that is oriented towards the aperture rim and is offset from the aperture rim. In other words, the internally-positioned terminal edge 120 is not directly adjacent the aperture rim 109, but instead is offset from the aperture rim 109, such that the first surface 104 is positioned radially between the aperture rim 109 and the internally oriented portion 120. This offset provides a location at which the flange 206 may engage the first surface.

Additionally, this offset distance allows for grommet tooling to be used in order to apply the grommet to the cord-securing mechanism 100. For example, in aspects in which the grommet 204 is present, the grommet 204 may be inserted within the aperture 108 by use of grommet tooling. Some grommet tooling is slightly larger in diameter than the grommet itself, yet smaller than the diameter between opposing cord-securing portions. Thus, the offset distance between the aperture rim 109 and the cord-securing portions 114 provide an appropriate amount of space to allow for the use of tooling in order to apply the grommet. Therefore, in one aspect, the offset distance between the aperture rim 109 and the cord-securing portion 114 is between 5 and 50% of the diameter of the grommet 204. Or, in another aspect, the diameter for tool clearance between opposing cord-securing portions may be between about 10 millimeters and about 15 millimeters. However, this 10 to 15 millimeter range is merely one example of acceptable tool clearance diameters, and other tool clearance diameters that are less than 10 millimeters or larger than 15 millimeters are considered to be within the scope of this application.

In accordance with other aspects herein, the internally-oriented portion 120 may be positioned directly adjacent the aperture rim 109, such that the first surface 104 is not positioned radially between the aperture rim 109 and the internally-oriented portion 120. In such an alternative embodiment, a different style of grommet may be used that does not engage the first surface, or the cord-securing mechanism may be coupled to the article using other attachment techniques described above.

Figure 9:
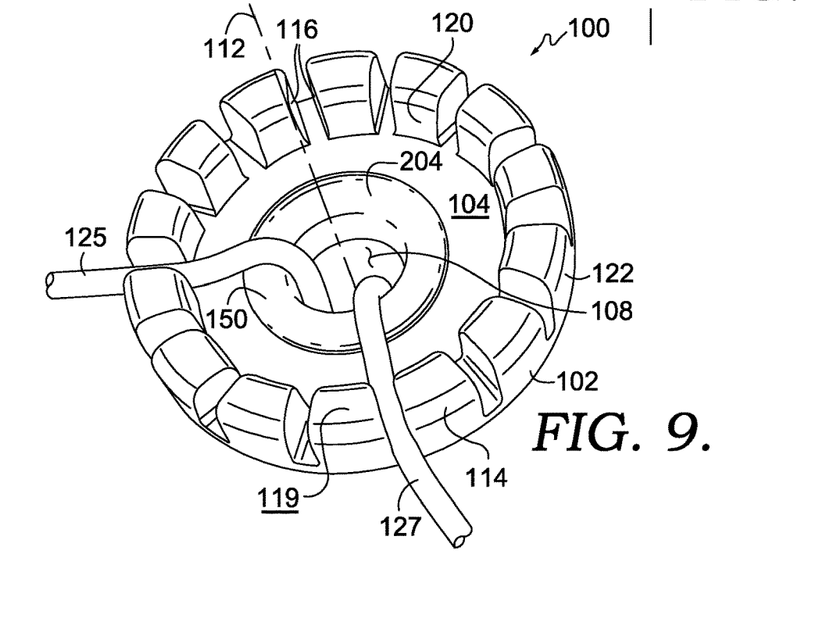
FIG. 9 depicts a perspective view of the assembly for securing the cord, wherein the assembly for securing the cord has the cord positioned within the assembly, in accordance with an aspect of the disclosure.

Turning now to FIG. 9, the cord-securing mechanism 100 is depicted as having a grommet 204 and a cord 124 positioned within the aperture 108. As illustrated in FIG. 9, a first portion 125 of the cord 124 is positioned within a first cord-receiving slot of the one or more cord-receiving slots 118, and a second portion 127 of the cord 124 is positioned within a second cord-receiving slot of the one or more cord-receiving slots 118. Also as best illustrated by FIG. 9, the cord 124 is generally parallel to the axis 112 when passing through the aperture 108, and the cord 124 is generally parallel to the first surface 104 of the base portion 102 (and perpendicular to the axis 112) when passing through the one or more cord-receiving slots 118. In other words, when the cord 124 is secured within one of the cord-receiving slots, the cord 124 makes a generally 90-degree turn between through the aperture 108 and the cord-receiving slot 118.

With continued reference to FIG. 9, the cord-securing portions 114 have a thickness defined as extending from the internally-oriented portion 120 to the externally-oriented portion 122. The thickness of the cord-securing portion 114 is variable dependent upon the amount of frictional force desired between the cord-retaining surfaces 116 and the cord 124. Therefore, in accordance with aspects herein, each of the one or more cord-receiving slots 118 is referred to as a "passageway" that extends between the internally-oriented portion 120 to the externally-oriented portion 124.

Figure 10:
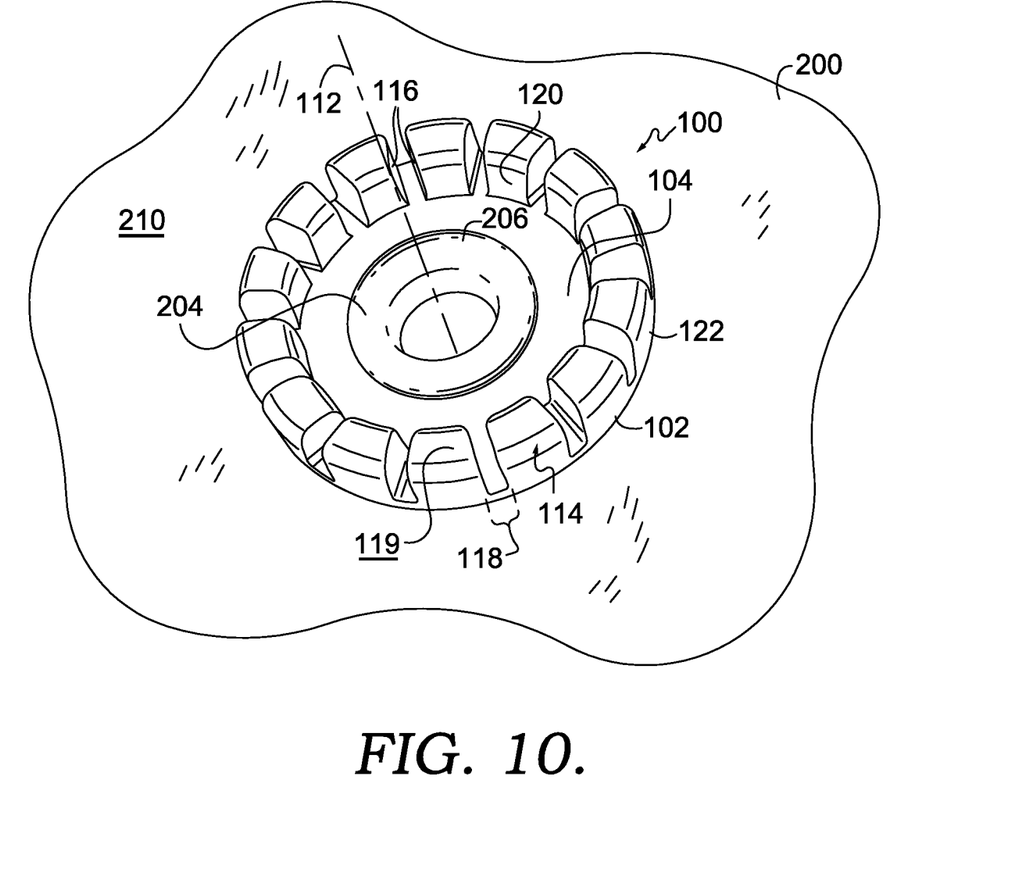
FIG. 10 depicts a perspective view of an article having the assembly for securing the cord, in accordance with an aspect of the disclosure.

Turning now to FIG. 10, the exemplary cord-securing mechanism 100 is illustrated as affixed to the article 200 through the use of the grommet 204. As discussed previously, the article 200 is exemplary, and it is contemplated that the cord-securing mechanism 100 may be utilized on many different types of articles. For example, as illustrated in FIG. 1, the article 200 may be a bag in which a cord is threaded around an aperture of the bag, wherein the cord is used to tighten or loosen the aperture. However, the article 200 may be a sweatshirt, jacket, sweatpants or athletic short, for adjusting the size of the exemplary article 200 to fit against a wearer.

Figure 11:
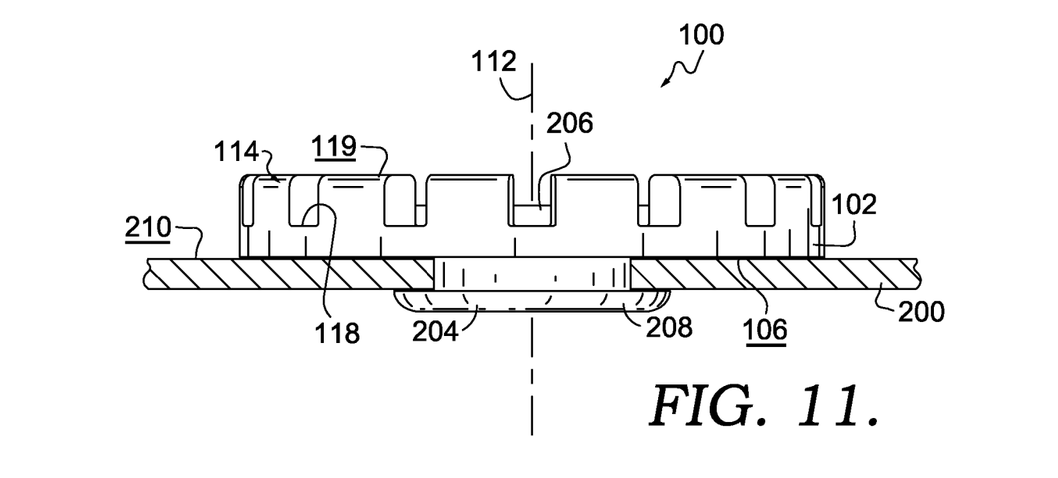
FIG. 11 depicts a side view of the article having the assembly for securing the cord, in accordance with an aspect of the disclosure.

With reference to FIG. 11, a side view of the exemplary cord-securing mechanism 100 shown in FIG. 10 is depicted as affixed to the article 200 through use of the grommet 204. As discussed previously, the grommet 204 is positionable within the aperture 108, such that the flange 206 engages the first surface 104 of the cord-securing mechanism 100. In accordance with this disclosure, the flange 206 may also be referred to as the "upper flange" 206. As such, the other flange of the grommet 204 may be referred to as a "lower flange" 208. Therefore, as illustrated in FIG. 11, the lower flange 208 engages a lower surface of the article 200, such that the article 200 is positioned between the lower flange 208 and the second surface 106.

The present invention has been described in relation to particular examples, which are intended in all respects to be illustrative rather than restrictive. Alternatives will become apparent to those of ordinary skill in the art to which the present invention pertains without departing from its scope. Certain features and subcombinations are of utility and may be employed without reference to other features and subcombinations and are contemplated within the scope of the disclosure and the claims.

The invention claimed is:

1. A cord-securing mechanism comprising:
   a base portion comprising a first surface, a second surface, a thickness extending between the first surface and the second surface, and an aperture extending entirely through the thickness and from the first surface to the second surface,
   wherein the aperture includes an aperture surface that circumscribes, and forms a perimeter around the aperture;
   wherein an aperture rim is positioned at a transition between the aperture surface and the first surface; and wherein the aperture includes an axis; and
a cord-securing portion coupled to the first surface and having an internally-oriented portion and an externally-oriented portion, the cord-securing portion including at least a pair of cord-retaining surfaces that oppose one another and that are spaced apart by a cord-receiving slot, wherein each cord-retaining surface of the at least the pair of cord-retaining surfaces has a height which extends from the first surface in a direction aligned parallel with the axis and extends radially away from the aperture rim, such that the height of each cord-retaining surface is larger than the thickness of the base portion; and
wherein a first distance between the at least the pair of cord-retaining surfaces at the externally-oriented portion of the cord-securing portion tapers from the height of the at least the pair of cord-retaining surfaces towards a second distance between the at least the pair of cord-retaining surfaces at the base portion, such that the first distance is larger than the second distance.

2. The cord-securing mechanism of claim 1, wherein the at least the pair of cord-retaining surfaces further comprises a first position and a second position, wherein the second position is positioned more radially outward relative to the first position, and wherein the at least the pair of cord-retaining surfaces tapers towards one another as the at least the pair of cord-retaining surfaces extend from the first position to the second position.

3. The cord-securing mechanism of claim 2, wherein the cord-securing portion includes a protruding member extending away from one of the at least the pair of cord-retaining surfaces towards the other of the at least the pair of cord-retaining surfaces, the protruding member being positioned at the second position.

4. The cord-securing mechanism of claim 3, wherein the protruding member includes a rib.

5. The cord-securing mechanism of claim 1, wherein the cord-securing portion has the height defined as extending from the first surface of the base portion to a distal surface of the cord-securing portion, the distal surface being an outermost surface in a direction aligned with the axis.

6. The cord-securing mechanism of claim 1, wherein the cord-securing portion includes a plurality of pairs of cord-retaining surfaces, wherein each pair of the plurality of pairs of cord-retaining surfaces is spaced apart by a respective cord-receiving slot, and wherein the plurality of pairs of cord-retaining surfaces are positioned radially around the aperture rim.

7. The cord-securing mechanism of claim 1, wherein the at least the pair of cord-retaining surfaces each includes an internally-positioned terminal edge that is oriented towards the aperture rim and is offset from the aperture rim.

8. A cord-securing mechanism comprising:
a base portion comprising a first surface, a second surface, a thickness extending between the first surface and the second surface, and an aperture extending entirely through the thickness and from the first surface to the second surface;
a cord-securing portion coupled to the first surface and having an internally-oriented portion and an externally-oriented portion, the cord-securing portion including at least a pair of cord-retaining surfaces that oppose one another and that are spaced apart by a cord-receiving slot, wherein the at least the pair of cord-retaining surfaces extend perpendicularly from the first surface; and wherein a first distance between the at least the pair of cord-retaining surfaces at the externally-oriented portion of the cord-securing portion expands from the height of the at least the pair of cord-retaining surfaces towards a second distance between the at least the pair of cord-retaining surfaces at the base portion, such that the first distance is smaller than the second distance.

9. The cord-securing mechanism of claim 8, wherein the cord-securing portion includes a protruding member extending away from at least one of the pair of the cord-retaining surfaces towards the other of the at least the pair of cord-retaining surfaces, and further wherein the protruding member includes a rib.

10. The cord-securing mechanism of claim 9, wherein a height of the rib is equal to the height of the at least the pair of cord-retaining surfaces.

11. A cord-securing mechanism comprising:
a base portion comprising a first surface, a second surface, a thickness extending between the first surface and the second surface;
an aperture having an axis, the aperture extending entirely through the thickness from the first surface to the second surface;
an aperture surface circumscribing and forming a perimeter around the aperture;
an aperture rim positioned at a transition between the aperture surface and the first surface;
a cord-securing portion coupled to the first surface, the cord-securing portion including at least a pair of cord-retaining surfaces that oppose one another and that are spaced apart by a cord-receiving slot, and
wherein the at least the pair of cord-retaining surfaces each includes an internally-positioned terminal edge that is oriented towards the aperture rim and is offset from the aperture rim, the at least the pair of cord-retaining surfaces extending radially outward from the axis, such that a distance between the at least the pair of cord-retaining surfaces tapers towards the internally-positioned terminal edge of the at least the pair of cord-retaining surfaces.

12. The cord-securing mechanism of claim 11, wherein the at least the pair of cord-retaining surfaces further comprises a height defined as extending from the first surface of the base portion to a distal surface of the cord-securing portion, wherein the at least the pair of cord-retaining surfaces are spaced apart by a first distance at the height and by a second distance at a location proximate the base portion, and wherein the first distance is greater than the second distance, such that the cord-receiving slot is narrower at the base portion.

13. The cord-securing mechanism of claim 12, wherein the at least the pair of cord-retaining surfaces further comprises the height defined as extending from the first surface of the base portion to a distal surface of the cord-securing portion, wherein the at least the pair of the cord-retaining surfaces are spaced apart by a first distance at the height and by a second distance at a location proximate the base portion, and wherein the first distance is smaller than the second distance, such that the cord-receiving slot is wider at the base portion.

14. The cord-securing mechanism of claim 12, wherein the internally-positioned terminal edge of the at least the pair of cord-retaining surfaces is offset a distance from the aperture rim, such that the distance is sized to couple to a grommet.

* * * * *